United States Patent Office 3,210,147
Patented Oct. 5, 1965

3,210,147
INSOLUBILIZED AND FLAME RETARDANT PHOSPHORYLATED POLYVINYL ALCOHOL FIBERS
John H. Johnson and Joseph E. Fields, Dayton, Ohio, assignors to Monsanto Company, a corporation of Delaware
No Drawing. Filed July 11, 1960, Ser. No. 41,742
6 Claims. (Cl. 8—115.5)

The present invention relates to treatment of polyvinyl alcohol types of fibrous products for the purpose of rendering them flame-retardent.

Polyvinyl alcohol type of fiber is well known to the trade as "Vinylon." It is generally manufactured from the polyvinyl alcohol which is obtained by substantial hydrolysis of a polyvinyl alkanoate having from 1 to 5 carbon atoms in the alkanoate group, e.g., polyvinyl formate, polyvinyl acetate, polyvinyl propionate or polyvinyl butyrate. The term "polyvinyl alcohol" as used herein means those hydrolysis products of the lower polyvinyl alkanoates in which the residual ester content is not more than 25%.

The fibers with which this invention is concerned are usually manufactured as follows: the fibers are spun by forcing the polyvinyl alcohol through nozzles into a coagulating bath which is usually an acidic, aqueous solution of an alkali sulfate, the resulting fibers are stretched several hundred percent, in or out of the bath, and then heated at, say, 100° C. to 250° C. for several minutes or longer. By this treatment crystallization of the polymer is accelerated and the units of the polymer structure are oriented so that the fiber becomes insoluble even in boiling water. Greater insolubility is obtained by subsequently treating the fiber with an agent which is capable of forming a cyclic acetal with two adjacent hydroxy groups of the polyvinyl alcohol. Commonly employed acetal-forming agents are aldehyde or aldehydes-liberating agents, particularly the lower alkanecarboxaldehydes such as formaldehyde, propionaldehyde and butyraldehyde. From 10 to 70% of the hydroxy groups of the fiber are thus reacted so that the polymer structure contains the unreacted units:

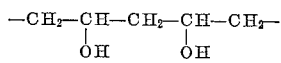

as well as the cyclic acetal units:

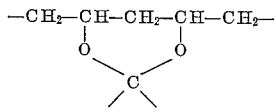

The acetalizing agent may also be a carboxaldehyde carrying halogen and/or an amino radical as a substituent, e.g., chloroacetaldehyde or aminoacetaldehyde. The aldehyde may be present in the polymeric form, e.g., as trioxymethylene for the formaldehyde source or as paraldehyde as the acetaldehyde source. It may also be present in combination with ammonia, e.g., as hexamethylenetetramine or in the form of a readily cleaved acetal, e.g., dimethyl acetal. The polyvinyl alcohol which is used in the fiber manufacture usually has a degree of polymerization which varies between, say, 8,000 to 20,000, and spinning is generally conducted from, say, 10% to 20% aqueous solutions thereof. The fiber may also be prepared directly from the polyvinyl carboxylate, substantially as described in the Belloc Patent No. 2,035,939, wherein polyvinyl acetate is first mixed with an organic solvent such as alcohol and a mineral acid such as hydrochloric acid and the resulting mixture is treated with an aldehyde such as trioxymethylene or paraldehyde. Here there is apparently almost simultaneous hydrolysis and acetalization.

Since polyvinyl alcohol fiber prepared as described above is an article of commerce and is well known to the art, hereinafter it will be referred to generically simply as insolubilized polyvinyl alcohol fiber, or as acetalized polyvinyl alcohol fiber or as formalized polyvinyl alcohol fiber when the acetal-forming agent used for decreasing the solubility of the fiber is formaldehyde.

While insolubilized polyvinyl alcohol fiber is of considerable interest owing to the economics of its manufacture and to its very good tensile strength and elasticity, the practical application thereof, particularly for domestic use, has been hampered by its high combustibility. Thus while woven and knitted garments manufactured therefrom are durable and attractive, they are known to be potentially dangerous owing to their ready flammability.

Now we have found that the polyvinyl alcohol fibers or articles made therefrom are rendered flame-retardant by treating them with phosphorylated polyvinyl alcohol or with the monoammonium salt of phosphorylated polyvinyl alcohol in such a manner that from, say, 0.5% to 10% by weight of the phosphorylated polyvinyl alcohol or salt thereof is incorporated into the fiber via transphosphorylation. In accordance with the terminology which has developed in this field, "rendering flame-retardant" means the treatment of a material so that it is resistant to the propagation of flame across its surface after the igniting flame has been removed; that is, a properly flame-retarded material will not support combustion independently of an external source of heat. In contact with an open flame, however, or at very high temperatures, flame-retarded organic materials can be expected to char and decompose.

In the problem of reducing the danger of fire in the use of various polymers, particularly in the case of those which do not contain nitrogen, it is obvious that the large proportion of carbon, hydrogen and oxygen which are present in most polymers renders them particularly susceptible to combustion. Hence it is surprising that upon treatment with another polymeric material the insolubilized polyvinyl alcohol fibers are caused to become flame retardant.

The phosphorylated polyvinyl alcohol which we employ for flame-proofing said fibers is well known to the art (see, e.g., Ferrel et al., J. Amer. Chem. Soc. 70 2103–4 (1948)). It may be prepared by reaction of polyvinyl alcohol with a phosphorylating agent such as phosphorus pentoxide, phosphoric acid or phosphoryl chloride or with a mono-salt of phosphoric acid such as urea phosphate or monoammonium phosphate. When phosphoryl chloride is used, the product will contain some chlorine, i.e., all of the chlorines of the phosphoryl chloride do not react, unless by cross-linking. However, the product is easily hydrolyzed to the free polyvinyl phosphoric acid. When urea phosphate is used, the product is a salt which is readily hydrolyzed either to the free polyvinyl phosphoric acid or to the monoammonium salt thereof. When monoammonium phosphate is used, the product is the monoammonium salt of phosphorylated polyvinyl alcohol which, of course, can also be hydrolyzed to the free acid. The extent of phosphorylation will depend upon the quantity of phosphorylating agent which is available and reaction time and temperature. For the present purposes it is desirable that at least 20% of the hydroxy radicals of the polyvinyl alcohol be phosphorylated. Generally, products in which from, say, 50% to 100% of said hydroxy groups have been phosphorylated are presently useful for flame-proofing the acetalized polyvinyl alcohol fibrous products.

The phosphorylated units are depicted by the formula

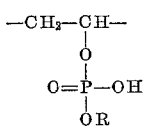

where R is selected from the class consisting of H and —NH$_4$. In addition to the above units, depending upon the extent of phosphorylation, there may be present in the phosphorylated polyvinyl alcohol units containing the unreacted hydroxy group

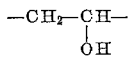

When commercial polyvinyl alcohol is used, there will probably also be present a small amount, not more than 25%, of units containing the carboxylate radical of the polyvinyl ester from which the polyvinyl alcohol is derived. This is because the method by which it is usually prepared, i.e., by hydrolysis of a polyvinyl alkanoate, generally gives a product which contains unhydrolyzed ester groups. It will be readily understood that when the partially unhydrolyzed material contains a preponderance of unhydrolyzed carboxylate groups, the extent of phosphorylation is not so great as when the polyvinyl alkanoate is substantially completely hydrolyzed. The presently useful phosphorylated polyvinyl alcohols are those obtained from polyvinyl ester hydrolysis products containing not more than 25% of unhydrolyzed ester groups. The degree of polymerization of the polyvinyl alcohol which is phosphorylated to give the presently useful flame-retarding agent is from 8,000 to 20,000.

The nature of the reaction between the phosphorylated polyvinyl alcohol and the acetalized polyvinyl alcohol fiber is not precisely understood, but it is believed to be predominantly transphosphorylation. Since the structures of the fiber which is presently treated and of the flame-retardant which is presently employed are both complex, the mechanism of the reaction can only be hypothesized. There should be present at least one acid group in the phosphorylated polyvinyl alcohol, i.e., at least one HO— group should be attached to the phosphorus. Hence, it is possible that transphosphorylation occurs between this group and a hydroxy radical of a partially acetalized polyvinyl alcohol fiber. On the other hand, flame-retardance can be obtained when the completely acetalized polyvinyl alcohol is treated with the phosphorylated polyvinyl alcohol. Since it is well known that the acetal groups are subject to cleavage by acids, the reaction thus can be explained by addition of the phosphorylated polyvinyl alcohol at the point of cleavage.

The present process of rendering flame-retardant polyvinyl alcohol fibers is of technical interest in that it permits treating the preformed fibers or the woven or knitted products made therefrom instead of requiring incorporation of the flameproofing agent during some stage of the fiber manufacturing process. The fiber or textile or matted products made therefrom are simply immersed into, or padded with, an aqueous solution of the phosphorylated polyvinyl alcohol, until from 0.5 to 10 parts of the latter has been incorporated into 100 parts of the fiber. The treated material is drained, air dried, and subsequently baked at a temperature of, say, 100° C. to 200° C. for a time of, say, a few minutes to an hour, depending upon the physical state, i.e., woven or unwoven state, porosity of texture, etc. of the fibrous material and the type of drying and/or baking facilities employed. The treated fiber or fabrics thus obtained will ignite when held in the open flame, but upon withdrawal from the flame, burning ceases, and there is no afterglow. The treated material is thus rendered self-extinguishing. Also, the treated material can be held just adjacent to the flame, e.g., just outside of the outer cone of the Bunsen burner flame without, itself, being ignited to flame. On the other hand, the flame of a Bunsen burner jumps from the burner to the untreated insolubilized polyvinyl alcohol when the latter is held near the burner flame. Noteworthy also is the fact that in spite of the remarkable flame-retardant property imparted to the fibrous products by treatment with the phosphorylated polyvinyl alcohol, no detrimental effect on the hand and feel, color brightness or pliability is noted. On the contrary, these physical attributes of the fibers appear to be enhanced by the presently provided flame-retardant treatment.

The present invention is further illustrated by, but not limited to, the following examples:

Example 1

A mono-ammonium salt of phosphorylated polyvinyl alcohol was prepared as follows from polyvinyl alcohol obtained by 86–89% hydrolysis of high viscosity polyvinyl acetate: A mixture consisting of 50 g. of the polyvinyl alcohol, 200 g. of urea, and 146 g. of 35% aqueous phosphoric acid was heated for 2 hours at 110° C. and then air-dried at 150° C. for about 15 minutes. The resulting mixture was dissolved in hot water and precipitated with acetone. Dissolving of the precipitate in water, reprecipitation from acetone and air drying of the precipitate gave the white, powdery mono-ammonium salt of polyvinyl-phosphoric acid, i.e., a product in which there was present a plurality of the units

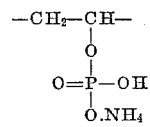

A 10% aqueous solution of the polymeric salt thus obtained was employed as a bath and a strip of commercially available, knitted fabric made of Vinylon (formalized polyvinyl alcohol fiber) was immersed therein briefly. The fabric was then air dried and heated at 105° C. for one hour. When the treated fabric was held in the flame of the Bunsen burner, it ignited; but as soon as it was withdrawn from flame, the burning ceased, and there was no after-glow. On the other hand, a strip of the untreated Vinylon fabric burned freely after withdrawal from the flame.

Example 2

Phosphorylated polyvinyl alcohol is prepared from a polyvinyl alcohol supplied by Du Pont de Nemours and Company as "Elvanol 72–51," and containing not more than 1.5% of unhydrolyzed ester groups. The phosphorylation is effected by mixing the polyvinyl alcohol with phosphoric acid containing an excess of phosphorus pentoxide (ca. 77% $P_2O_5$) and allowing the resulting mixture to stand, with periodic stirring, for about three days. The product thus obtained is 60% phosphorylated polyvinyl alcohol, i.e., 60% of the —CH$_2$CH(OH)— of the polyvinyl alcohol have been converted to the unit

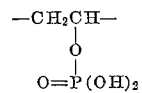

A sample of the Vinylon fabric is treated with a 15% aqueous solution of the 60% phosphorylated polyvinyl alcohol in a padding machine at a temperature of about 45° C. The treated fabric is allowed to drain, dried for about one hour in a circulating air oven, and finally baked at 150° C. The treated cloth possesses flame-retardant properties which resist washing and has a good feel.

Relatively dilute solutions of the phosphorylated polyvinyl alcohol, say, from 1% to 5% of the phosphorylated product in water may be employed for application thereof to Vinylon fibers or fabrics. Concentrated solutions, say, solutions containing up to 40% or 50% of the phosphorylated product, may be prepared, especially with the aid of chemical dispersing agents, and the concentrates may then be diluted to a satisfactorily usable dilution prior to application to the Vinylon. In general, suitable treating solutions may contain from, say, 1% to 20% of the phosphorylated polyvinyl alcohol in water.

Where wash-resistance is not a factor, the wetted fabric may simply be allowed to drain and dry at ordinary temperatures. However, for long-lasting flame-resistance, i.e., such that will survive exposure to the elements and repeated washings, heating of the dried fabric at a temperature of, say, 125° C. to 200° C. is advisable. Long wear can also be furthered by immersion or other contact of the treated polyvinyl alcohol fiber, advantageously prior to drying, with a dilute, aqueous solution of a lower alkanecarboxaldehyde, e.g., formaldehyde.

Operating as herein described, there are readily obtained polyvinyl alcohol fibers comprising from 0.5% to 10% by weight of the phosphorylated polyvinyl alcohol or the ammonium salt thereof. While flame-retardant effect of the phosphorylated polymer is exhibited at concentrations which are as low as 0.5%, it is generally preferred to employ a somewhat greater quantity of the polymer for the purpose of assuring uniform protection. Generally, quantities of from 2.0% to 7.0% are advantageously employed.

What we claim is:

1. A flame-retardant fibrous material obtained by treating an acetalized polyvinyl alcohol is fibrous form and having a degree of acetalization of from 10% to 70% with an aqueous solution of phosphorylated polyvinyl alcohol, said phosphorylation being the replacement of at least 20% of the hydroxy groups with the radical

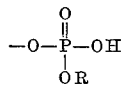

wherein R is selected from the class consisting of H and —NH$_4$, and heating the treated material at a temperature of 100° C. to 200° C.

2. A flame-retardant fibrous material obtained by treating a formalized polyvinyl alcohol in fibrous form and having a degree of substitution of from 10% to 70% with an aqueous solution of phosphorylated polyvinyl alcohol, said phosphorylation being the replacement of from 50% to 100% of the hydroxy groups with the radical

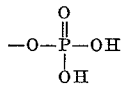

and heating the treated material at a temperature of 100° C. to 200° C.

3. A flame-retardant fibrous material obtained by treating a formalized polyvinyl alcohol in fibrous form and having a degree of substitution of from 10% to 70% with an aqueous solution of phosphorylated polyvinyl alcohol, said phosphorylation being the replacement of from 50% to 100% of the hydroxy groups with the radical

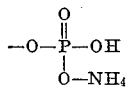

and heating the treated material at a temperature of 100° C. to 200° C.

4. A flame-retardant fibrous material obtained by treating hydrolyzed and subsequently acetalized polyvinyl lower alkanoate in fibrous form and wherein the degree of hydrolysis is at least 75% and the degree of acetalization is from 10% to 70% of the hydroxy groups provided by said hydrolysis, with an aqueous solution of hydrolyzed and subsequently phosphorylated polyvinyl lower alkanoate wherein the degree of hydrolysis is at least 75%, said phosphorylation being the replacement of at least 20% of the hydroxy groups provided by said hydrolysis with the radical

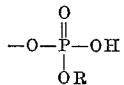

wherein R is selected from the class consisting of H and —NH$_4$, and heating the treated material, at a temperature of 100° C. to 200° C.

5. A flame-retardant fibrous material obtained by treating hydrolyzed and subsequently formalized polyvinyl lower alkanoate in fibrous form and wherein the degree of hydrolysis is at least 75% and the degree of formalization is from 10% to 70% of the hydroxy groups provided by said hydrolysis, with an aqueous solution of hydrolyzed and subsequently phosphorylated polyvinyl lower alkanoate wherein the degree of hydrolysis is at least 75%, said phosphorylation being the replacement of from 50% to 100% of the hydroxy groups provided by said hydrolysis with the radical

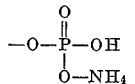

and heating the treated material at a temperature of 100° C. to 200° C.

6. A flame-retardant fibrous material obtained by treating hydrolyzed and subsequently formalized polyvinyl lower alkanoate in fibrous form and wherein the degree of hydrolysis is at least 75% and the degree of formalization is from 10% to 70% of the hydroxy groups provided by said hydrolysis, with an aqueous solution of hydrolyzed and subsequently phosphorylated polyvinyl lower alkanoate wherein the degree of hydrolysis is at least 75%, said phosphorylation being the replacement of from 50% to 100% of the hydroxy groups provided by said hydrolysis with the radical

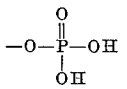

and heating the treated material at a temperature of 100° C. to 200° C.

References Cited by the Examiner

UNITED STATES PATENTS

| | | | |
|---|---|---|---|
| 2,610,953 | 9/52 | Daul et al. | 117—136 XR |
| 2,691,566 | 10/54 | Kvalnes et al. | 8—115.5 |
| 2,691,567 | 10/54 | Kvalnes et al. | 8—115.5 |
| 3,068,061 | 12/62 | Johnson et al. | |

FOREIGN PATENTS

| | | |
|---|---|---|
| 608,668 | 9/48 | Great Britain. |
| 765,222 | 1/57 | Great Britain. |

OTHER REFERENCES

Ferrel et al.: American Chemical Society, 70, pages 2103–4, 1948.

NORMAN G. TORCHIN, *Primary Examiner.*

MORRIS O. WOLK, *Examiner.*